United States Patent
Kozak et al.

(10) Patent No.: US 7,353,147 B2
(45) Date of Patent: Apr. 1, 2008

(54) COMPUTER AIDED DESIGN ASSOCIATIVE DESIGN PROCESS

(75) Inventors: Edward Kozak, Troy, MI (US); Jim Yoos, Southgate, MI (US); Randall Lomako, Canton, MI (US); Robert Mercieca, Brighton, MI (US); Lori Spalding, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 296 days.

(21) Appl. No.: 10/908,996

(22) Filed: Jun. 3, 2005

(65) Prior Publication Data

US 2006/0277003 A1 Dec. 7, 2006

(51) Int. Cl.
*G06F 17/50* (2006.01)
*G06F 9/45* (2006.01)

(52) U.S. Cl. ............................. 703/2; 703/5; 361/818; 700/182; 717/136

(58) Field of Classification Search .................. 703/2, 703/5, 7; 717/136; 361/818; 706/919; 700/182
See application file for complete search history.

(56) References Cited

U.S. PATENT DOCUMENTS 6,486,878 B1  11/2002 Subrahmanyam et al.
2001/0013165 A1*  8/2001 Hansen et al. ........... 29/407.05
2003/0016519 A1*  1/2003 Bachman ..................... 361/818
2006/0242630 A1*  10/2006 Koike et al. ................. 717/136

OTHER PUBLICATIONS

CATIA-Generative Shape Design 2 (GSD) brochure CATIA V5R14—2002-2004-Dassault Systemes.

* cited by examiner

*Primary Examiner*—Thai Phan
(74) *Attorney, Agent, or Firm*—Gary A. Smith; Brooks Kushman P.C.

(57) ABSTRACT

A system and method for designing components through the use of a computer having a computer aided design (CAD) software enables a reduction in the occurrence of infinite looping. The method includes the step of identifying common areas between the components, wherein the components have a three-dimensional relationship through the use of the computer. Another step includes traversing the common areas with at least one parallel division plane through the use of the computer and trimming the component to the at least one parallel division plane. Yet another step includes storing the component in the computer memory as a first product layout and a second product layout. The method further includes integrating the first and second product layouts through the use of an architectural layout function thereby reducing the occurrence of infinite looping by the CAD software.

17 Claims, 5 Drawing Sheets

COMPUTER AIDED DESIGN ASSOCIATIVE DESIGN PROCESS

BACKGROUND OF THE INVENTION

1. Field of the Invention

The present invention relates generally to computer aided design ("CAD"). More specifically, the present invention relates to an associative computer aided design methodology.

2. Background Art

The present invention is a new and more-effective methodology for associative computer aided design. "Catia V5" is computer software available from DASSAULT SYSTEMES, 9, quai Marcel Dassault, BP 310 92156 Suresnes Cedex, France (www.3ds.com). The functionality and operation of Catia V5 is generally known in the computer aided design industry. Catia V5 provides three functions to implement associative computer aided design: (1) "Reference-Reference," (2) "Reference-Instance," and (3) "Instance-Instance." These functions are referred to as "Multi-Model Links" or "MMLs."

One drawback of the associative computer aided design methodologies provided in Catia V5 is an undesirable phenomena referred to here as "looping." In one example, looping occurs when Catia MMLs are used in the computer aided design of a multi-component structure that interfaces with itself in some fashion to create a somewhat "continuous" structure. One example of such a structure is a shell or enclosure, such as an automobile. An automobile body comprises a plurality of different components, or component groups, that must collectively (and accurately) fit together in a finished assembly. Assuming that adjacent components in the assembly are associatively linked using one or more Catia MML functions, a change to one component may result in an undesired "loop" or "infinite loop" of all components in the assembly. Other examples of structures vulnerable to the looping phenomena may exist.

Because of the looping problem, some companies simply do not let their computer aided designers use the Catia V5 associative design functions. Other companies use pen-and-paper methods to manage and control associativity among structures vulnerable to looping. One method is the use of one or more "central" spreadsheets by all computer aided designers engineers involved in the design of a structure vulnerable to looping.

While the spreadsheet method may technically be effective at reducing or eliminating the looping phenomena, it is not an automated, efficient or robust solution—especially when there are a large number of designers or structures involved.

The present invention is a method that allows computer aided designers to avail themselves of associative design functionality, such as that provided by Catia V5, while at the same time avoiding the undesirable looping problem associated with the prior art.

SUMMARY OF THE INVENTION

The present invention includes a method for designing components through the use of a computer having a computer aided design (CAD) software. The method includes the step of identifying common areas between the components, wherein the components have a three-dimensional relationship through the use of the computer. Another step includes traversing the common areas with at least one parallel division plane through the use of the computer and trimming the component to the at least one parallel division plane. Yet another step includes storing the component in the computer memory as a first product layout and a second product layout. The method further includes integrating the first and second product layouts through the use of an architectural layout function thereby reducing the occurrence of infinite looping by the CAD software.

DETAILED DESCRIPTION OF THE PREFERRED EMBODIMENTS

While an example methodology for implementing the present invention is provided in the context of Catia V5, the scope of the present invention is not so limited. Those of ordinary skill in the art of computer aided design and computer software will understand that the concepts and methodologies expressed in the context of the present invention may also be implemented in different ways, using computer software other than Catia V5.

An understanding of the functionality and operation of known computer aided design software, such as Catia V5, is assumed herein. Such software applications are regularly used by computer aided designers. Additional information concerning Catia V5 in general, and reference to any Catia V5-specific functions referenced herein, are available from DASSAULT SYSTÈMES, 9, quai Marcel Dassault, BP 310 92156 Suresnes Cedex, France (www.3ds.com).

By way of example, a preferred methodology for implementing the present invention is described below. The provided methodology may be adapted, modified or rearranged to best-fit a particular implementation of the present invention.

Figure 1:
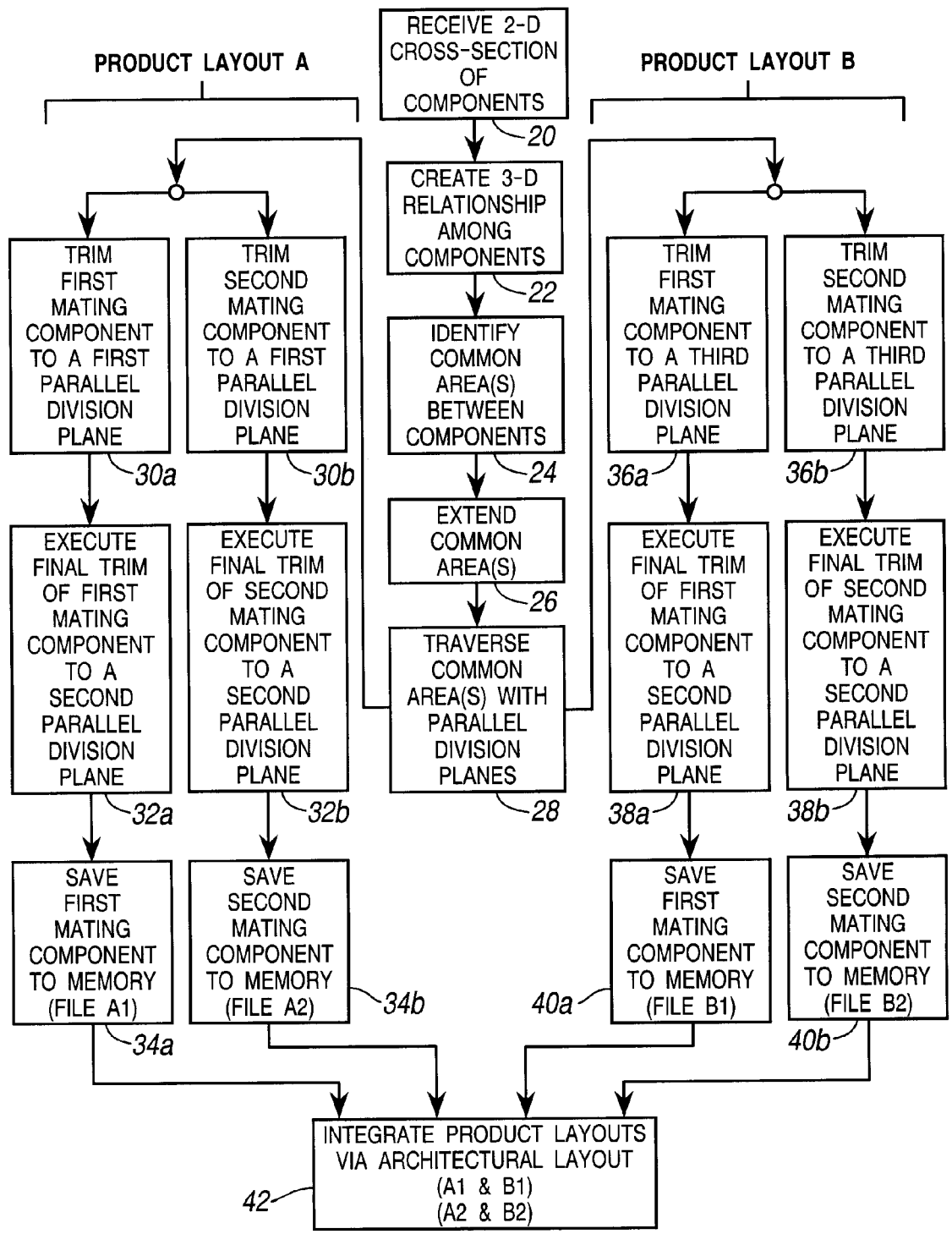
FIG. 1 illustrates a flow diagram of a methodology that enables the use of an associativity function associated with a computer aided design software.
Figure 2:
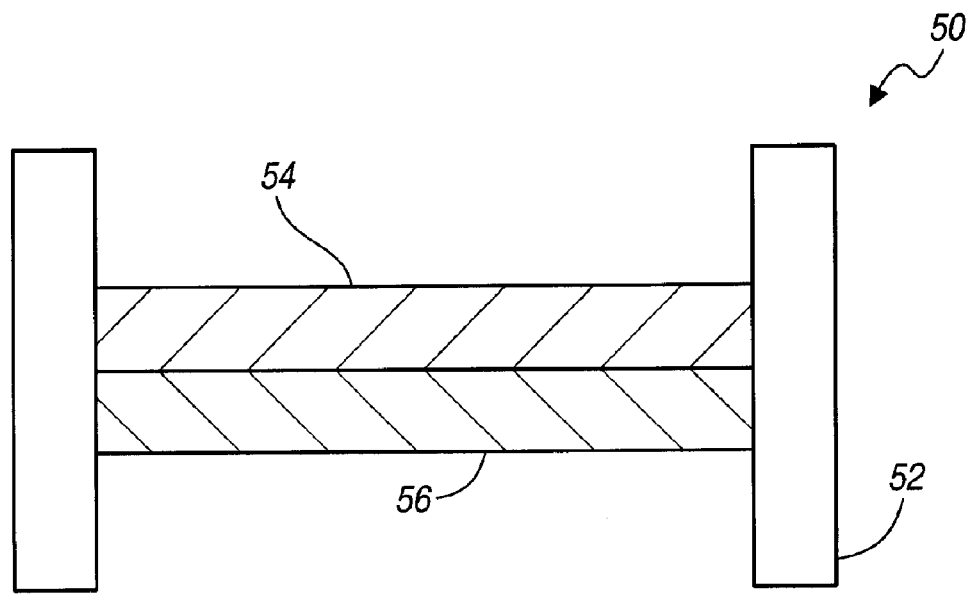
FIG. 2 illustrates a step in the flow diagram of FIG. 1 wherein a two-dimensional cross-section of exemplary components are received.

Referring to FIG. 1, a flow diagram of a methodology is illustrated that enables the use of an associativity function associated with computer aided design (hereinafter referred to as CAD) software. At a step 20, during the computer aided design process, a two-dimensional cross-section of the components is received at a computer (not shown) having the CAD software. An exemplary embodiment of the two-dimensional cross-section of the components of step 20 is illustrated in FIG. 2. The embodiment shown in FIG. 2, for illustration purposes, is an I-beam 50 that includes flanges 52, a first mating component 54, and a second mating component 56. As shown, first and second mating components 54 and 56 overlap thereby forming a common area.

Figure 3:
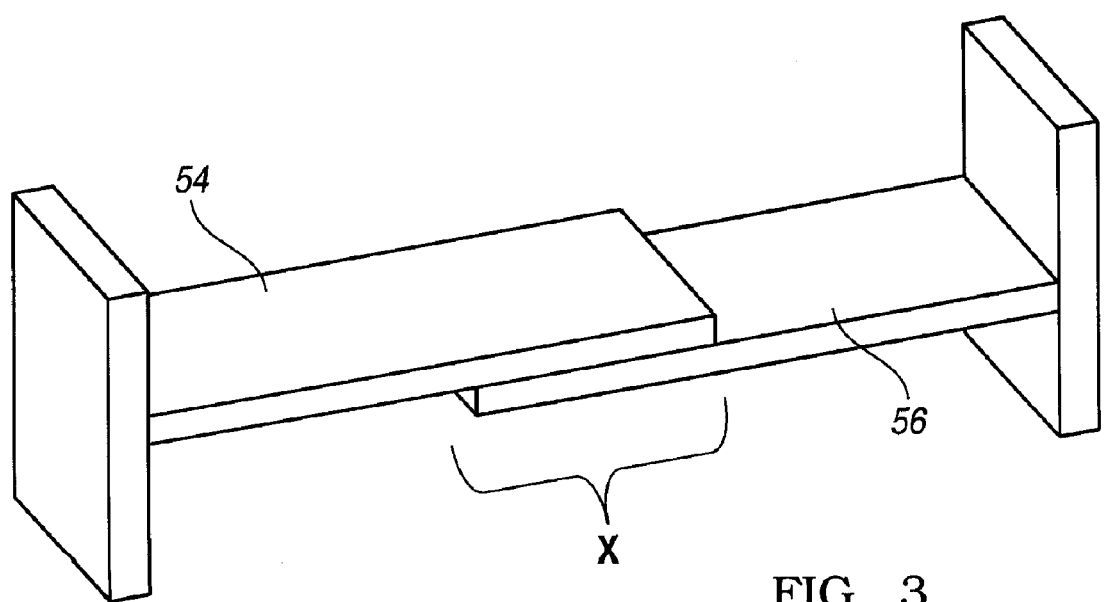
FIG. 3 illustrates a step in the flow diagram of FIG. 1 wherein a three-dimensional representation of the exemplary components of FIG. 2 is created.

Following receipt of the two-dimensional cross-section of the component(s), a step 22 occurs. At step 22, the CAD software being operable with the computer creates a three-dimensional relationship among the components (e.g., first mating component 54 and second mating component 56). FIG. 3 illustrates an embodiment of a three-dimensional I-beam as created during step 22.

Figure 4:
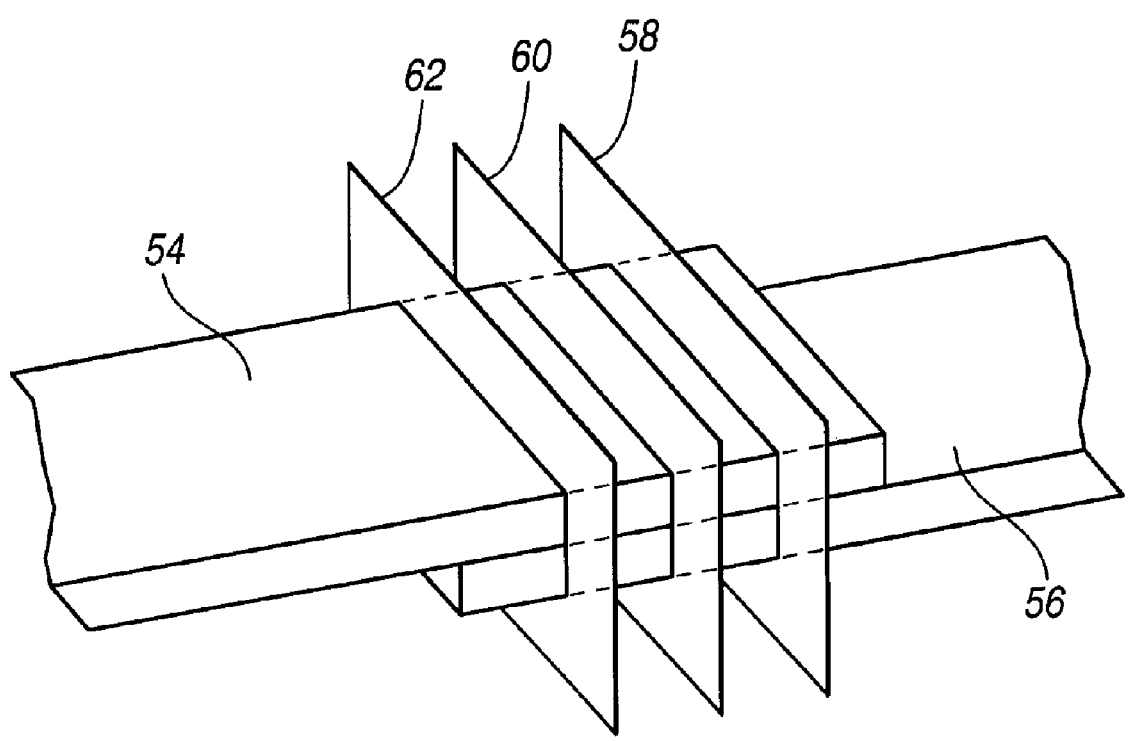
FIG. 4 illustrates a step in the flow diagram of FIG. 1 wherein the common areas of the exemplary components are traversed by parallel division planes.

At a step 24, the CAD software identifies any common areas between respective components. As discussed in the foregoing and illustrated by FIG. 3, first and second mating components 54 and 56 form a common area as indicated by bracket "X". At a step 26, the CAD software extends the common areas to a predetermined size. The common areas are extended because the end interfaces of product layouts A and B have not yet been designed during a CAD process. At a step 28, the common areas between first and second mating components 54 and 56 are traversed by multiple parallel division planes. FIG. 4 illustrates the traversal of first and second mating components 54 and 56 by a first parallel division plane 58, a second parallel division plane 60, and third parallel division plane 62. As recognized by one of ordinary skill in the art, the complexities of first and second mating components 54 and 56 may vary depending upon the specific product design requirements. Accordingly, parallel division planes 58, 60 and 62 enable improved matching of complexities such as fillets, rounds, and contours. As also recognized by one of ordinary skill in the art, Catia V5 has the functionality to create parallel division planes 58, 60 and 62.

In one embodiment, the parallel division planes 58, 60 and 62 have an overlap of about 5 mm. It is recognized, however, that the overlap between parallel division planes 58, 60 and 62 may vary without departing from the scope of the present invention. Furthermore, if a division plane is not a true radial to a complexity, an overlap region may be necessary to avoid gapping between mating components.

To eliminate and/or reduce the possibility of an undesired loop or infinite loop occurrence during the operation of the associativity function, first and second mating components 54 and 56 are designed separately as product layouts "A" and "B". As will be discussed hereinafter, product layouts A and B are comprised of trimmed embodiments of first and second mating components 54 and 56. For example, product layout A includes first and second mating components 54 and 56 that are initially trimmed, through the use of Catia V5, to parallel division plane 58 and finally trimmed to parallel division plane 60. Product layout B also includes first and second mating components 54 and 56 that are initially trimmed, through the use of Catia V5, to parallel division plane 62 and finally trimmed to parallel division plane 60.

Figure 5A:
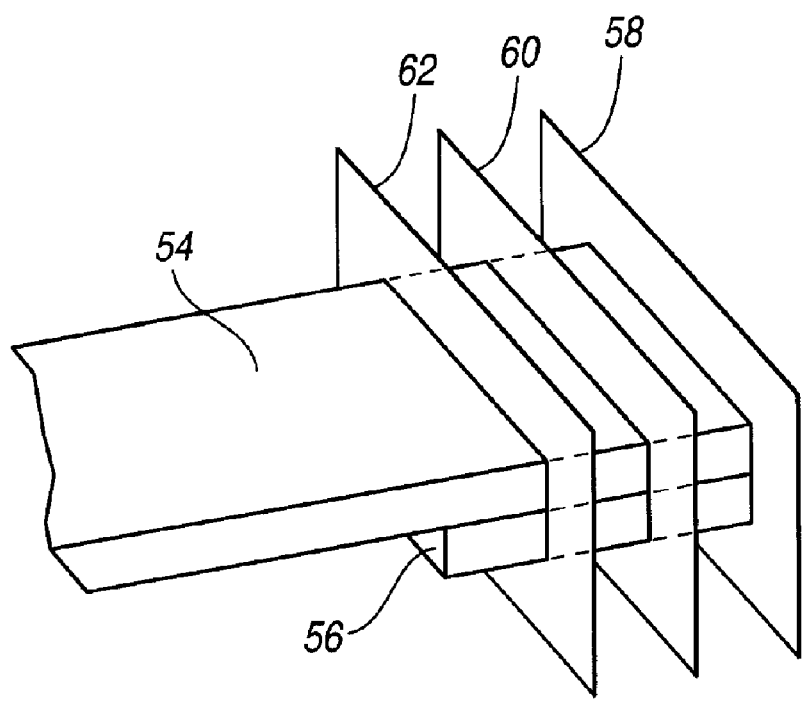
FIG. 5A illustrates yet another step in the flow diagram of FIG. 1 wherein the exemplary components are initially trimmed.
Figure 5B:
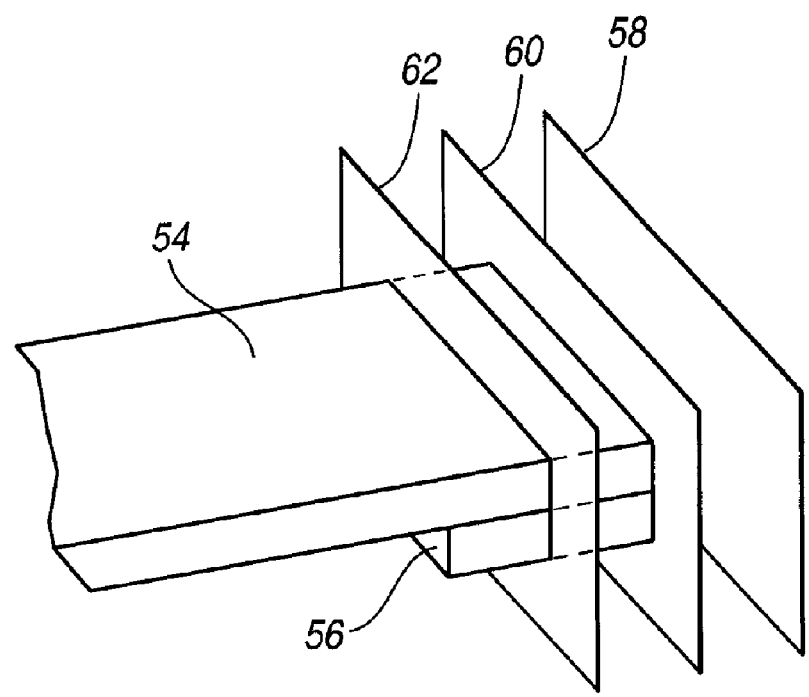
FIG. 5B illustrates yet another step in the flow diagram of FIG. 1 wherein the exemplary components are finally trimmed.

Referring back to FIG. 1, at steps 30(a) and 30(b), mating components 54 and 56 are trimmed to a first parallel division plane. In particular, mating components 54 and 56 are trimmed to parallel division plane 58, as illustrated by FIG. 5A. Additionally, depending upon specific design requirements, a designer may create and add radius, rounds, or fillets to oversize the planes at steps 30(a) and 30(b). At steps 32(a) and 32(b), a final trim is executed on mating components 54 and 56. FIG. 5B illustrates mating components 54 and 56 following the final trim to parallel division plane 60. At steps 34(a) and 34(b), mating components 54 and 56 are saved to the computer memory in individual files. As shown in FIG. 1, the respective files for mating components 54 and 56 are referred to as file A1 and file A2. Accordingly, product layout A includes files A1 and A2.

Figure 6A:
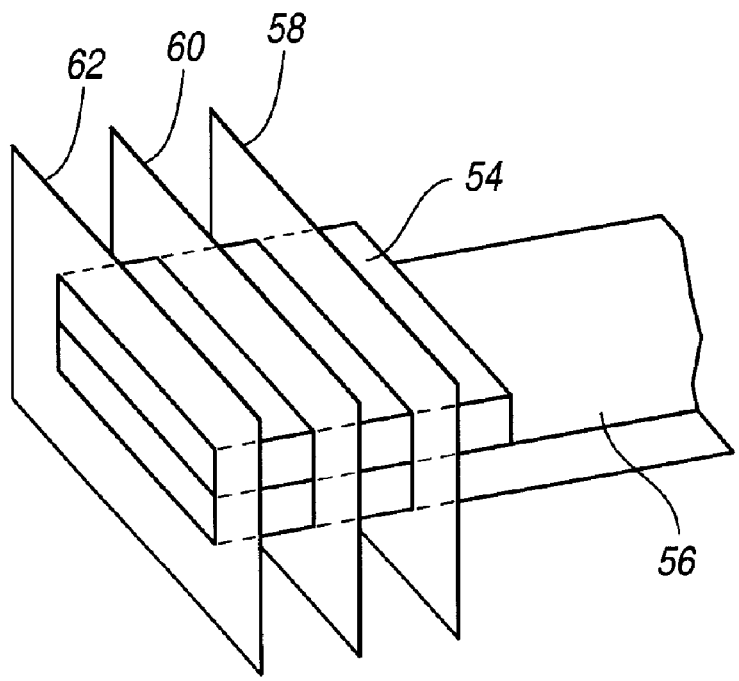
FIG. 6A illustrates yet another step in the flow diagram of FIG. 1 wherein the exemplary components are initially trimmed.

Product layout B is designed following substantially the same method as product layout A. As such, at steps 36(a) and 36(b), mating components 54 and 56 are trimmed to a parallel division plane. Specifically, at steps 36(a) and 36(b), mating components 54 and 56 are trimmed to a third parallel division plane 62, as illustrated by FIG. 6A. As discussed above, a designer may add radius, rounds, or fillets at steps 36(a) and 36(b) to oversize the planes before final trim.

Figure 6B:
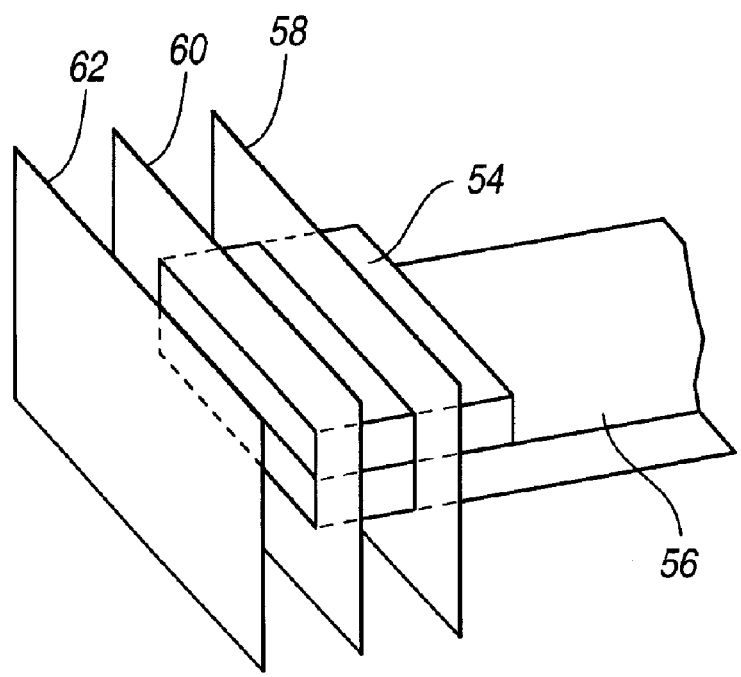
FIG. 6B illustrates yet another step in the flow diagram of FIG. 1 wherein the exemplary components are finally trimmed.

At steps 38(a) and 38(b), a final trim to a second parallel division plane is executed on mating components 54 and 56, respectively. In particular, as illustrated by FIG. 6B, mating components 54 and 56 are trimmed to parallel division plane 60.

At steps 40(a) and 40(b), each designed mating component 54 and 56 is saved in memory to a separate file. In particular, as illustrated at steps 40(a) and 40(b), mating components 54 and 56 are saved in memory in files B1 and B2. Accordingly, as discussed above, product layout B includes files B1 and B2.

At a step 42, product layouts A and B are integrated by the computer through the use of an architectural layout function within Catia V5. The architectural layout bridges any gaps between product layout A and product layout B. Accordingly, files A1 and B1 are integrated as well as files A2 and B2 are integrated. Through the use of Catia V5 the associativity function referred to as reference-instance is utilized to design the components that are stored in files A1, A2, B1, and B2. Because there are no direct links between product layouts A and B, the occurrence of infinite looping associated with conventional computer-aided designs is virtually eliminated.

While the best mode for carrying out the invention has been described in detail, those familiar with the art to which this invention relates will recognize various alternative designs and embodiments for practicing the invention as defined by the following claims.

What is claimed is:

1. A method of associative computer aided design for designing components through the use of a computer having a computer aided design (CAD) software and a computer memory, the method comprising the steps of:

identifying common areas between the components, wherein the components have a three-dimensional relationship through the use of the computer;

traversing the common areas with at least one parallel division plane through the use of the computer;

trimming the components to the at least one parallel division plane;

storing the components in the computer memory as a first product layout and a second product layout; and integrating the first and second product layouts through the use of an architectural layout function thereby reducing the occurrence of infinite looping by the CAD software.

2. A method according to claim 1, wherein the step of traversing the common areas with at least one parallel division plane includes traversing the common areas with a first, second, and third parallel division plane.

3. A method according to claim 1, wherein the step of trimming the components to the at least one parallel division plane comprises:

trimming the components to a first parallel division plane and to a second parallel division plane; and trimming the components to a third parallel division plane and to the second parallel division plane.

4. A method according to claim 1, further including the step of creating additional radius, rounds, or fillets for the components that are trimmed to the at least one parallel division plane.

5. A method according to claim 1, wherein the step of trimming the components to the at least one parallel division plane includes trimming a first and second mating component to the at least one parallel division plane.

6. A method according to claim 5, wherein the step of storing the components in the computer memory as a first product layout and a second product layout includes storing the first and second mating components in the computer memory as separate files in a first product layout and storing the first and second mating components in the computer memory as separate files in a second product layout.

7. A method according to claim 1, wherein the step of storing the components in the computer memory as a first product layout and a second product layout includes storing the components in separate files in the computer memory as a first product layout and storing the components in separate files in the computer memory as a second product layout.

8. A computer system having a computer memory operable with a computer aided design (CAD) software for designing components, the system being configured to:
   create a three-dimensional relationship among the components through the use of the computer;
   identify common areas between the components through the use of the computer;
   extend the identified common areas through the use of the computer;
   traverse the common areas with at least one parallel division plane;
   trim the components to the at least one parallel division plane through the use of the computer;
   store the components in the computer memory as a first product layout and a second product layout; and
   integrate the first and second product layouts through the use of an architectural layout function thereby reducing the occurrence of infinite looping by the CAD software.

9. A system according to claim 8, wherein the system is configured to traverse the common areas with a first, second, and third parallel division plane.

10. A system according to claim 9 wherein the system is further configured to:
    trim the components to the first parallel division plane and to the second parallel division plane; and
    trim the components to the third parallel division plane and to the second parallel division plane.

11. A system according to claim 8, wherein the system is configured to create additional radius, rounds, or fillets for the components that are trimmed to the at least one parallel division plane.

12. A system according to claim 8, wherein the system is further configured to store the components in separate files in the computer memory as the first product layout and store the components in separate files in the computer memory as the second product layout.

13. A system according to claim 8, wherein the system is further configured to trim a first and second mating component to the at least one parallel division plane.

14. A system according to claim 13, wherein the system is further configured to store the first and second mating components in the computer memory as separate files in the first product layout and store the first and second mating components in the computer memory as separate files in the second product layout.

15. A method of associative computer aided design for designing a device having a first and a second mating component through the use of a computer having computer aided design (CAD) software and a computer memory, the method comprising the steps of:
    creating a three-dimensional relationship among the first and second mating component through the use of the computer;
    identifying common area(s) between the first and second mating component through the use of the computer;
    extending the common area(s) between the first and second mating component through the use of the computer;
    traversing the common area(s) with a first parallel division plane, a second parallel division plane, and a third parallel division plane;
    trimming the first and second mating component to the first parallel division plane and the second parallel division plane;
    storing the trimmed first and second mating component to the computer memory in separate files as a first product layout;
    trimming the first and second mating component to the third parallel division plane and the second parallel division plane;
    storing the trimmed first and second mating component to the computer memory in separate files as a second product layout; and
    integrating the first and second product layouts in the computer memory through the use of an architectural layout function thereby reducing the occurrence of infinite looping by the CAD software.

16. A method according to claim 15, wherein the step of storing the trimmed first and second mating component to the computer memory includes storing the first mating component in a first file and the second mating component in a second file.

17. A method according to claim 15, further including the step of creating additional radius, rounds, or fillets for the trimmed first and second mating components.

* * * * *